United States Patent
Leflay et al.

(10) Patent No.: US 11,986,872 B2
(45) Date of Patent: May 21, 2024

(54) METHOD OF CONTROLLING A ROLL GAP IN A ROLLING MILL

(71) Applicant: PRIMETALS TECHNOLOGIES, LIMITED, London (GB)

(72) Inventors: Stuart Leflay, Sothall Sheffield (GB); Rhodri Evans, Sheffield (GB); Philip Lawlor, Dorset (GB)

(73) Assignee: PRIMETALS TECHNOLOGIES, LIMITED (GB)

( * ) Notice: Subject to any disclaimer, the term of this patent is extended or adjusted under 35 U.S.C. 154(b) by 0 days.

(21) Appl. No.: 17/773,714

(22) PCT Filed: Sep. 9, 2020

(86) PCT No.: PCT/EP2020/075190
§ 371 (c)(1),
(2) Date: May 2, 2022

(87) PCT Pub. No.: WO2021/089219
PCT Pub. Date: May 14, 2021

(65) Prior Publication Data
US 2022/0379360 A1    Dec. 1, 2022

(30) Foreign Application Priority Data
Nov. 8, 2019  (EP) .................................... 19207929

(51) Int. Cl.
*B21B 38/10*    (2006.01)
(52) U.S. Cl.
CPC ........ *B21B 38/105* (2013.01); *B21B 2267/18* (2013.01); *B21B 2271/02* (2013.01)
(58) Field of Classification Search
CPC ... B21B 38/10; B21B 38/015; B21B 2267/02; B21B 2267/06; B21B 2267/18;
(Continued)

(56) References Cited

U.S. PATENT DOCUMENTS 3,415,097 A * 12/1968 Wheeler ................. B21B 31/24
72/248
3,646,686 A * 3/1972 Kreiskorte .............. B21B 38/10
33/657
(Continued)

FOREIGN PATENT DOCUMENTS

CA    2350534 A1    5/2000
CN    1326386 A    12/2001
(Continued)

OTHER PUBLICATIONS

JP 62-287112A, Ichikawa Dec. 1987.*
(Continued)

*Primary Examiner* — Edward T Tolan
(74) *Attorney, Agent, or Firm* — OSTROLENK FABER LLP

(57) ABSTRACT

A method of controlling a roll gap between first and second work rolls (102, 104) that includes defining a plurality of work surface locations spaced apart along the first work roll (102) in the longitudinal direction; obtaining a radius of the work surface (102a) of the first work roll (102) at each of the work surface locations; based on the radii of the work surface locations, obtaining a longitudinal profile of the work surface (102a); based on the longitudinal profile, tilting the first work roll (102) relative to the second work roll (104) in the common plane in order to reduce a difference in the average size of the gap either side of a centerline (CL), which bisects the longitudinal axes of the first and second work rolls (102, 104).

11 Claims, 7 Drawing Sheets

(58) Field of Classification Search
CPC ............ B21B 2267/19; B21B 2267/20; B21B 2267/24; B21B 2271/02; B21B 2271/025; B21B 2273/04; B21B 37/58; G01B 21/10
See application file for complete search history.

(56) References Cited

U.S. PATENT DOCUMENTS

| | | | |
|---|---|---|---|
| 3,777,526 | A | 12/1973 | Fink et al. ........................ 72/35 |
| 4,186,579 | A | 2/1980 | Eibe ............................... 72/13.4 |
| 4,397,097 | A | 8/1983 | Damrau et al. ................. 33/657 |
| 5,533,371 | A | 7/1996 | Frischknecht et al. .......... 72/2.1 |
| 6,766,934 | B2 * | 7/2004 | Ziegelaar ................ B21B 37/68 72/234 |
| 7,316,146 | B2 | 1/2008 | Seilinger et al. ............ 72/252.5 |
| 2009/0139290 | A1 | 6/2009 | Britanik et al. ................. 72/9.2 |

FOREIGN PATENT DOCUMENTS

| | | | | |
|---|---|---|---|---|
| CN | 1555297 | A | | 12/2004 |
| CN | 2736076 | Y | | 10/2005 |
| CN | 102861771 | A | | 1/2013 |
| CN | 103203371 | A | | 7/2013 |
| CN | 203830423 | U | | 9/2014 |
| CN | 204078991 | U | | 1/2015 |
| CN | 106248036 | A | | 12/2016 |
| DE | 4307617 | A1 * | 9/1994 | ............ G01B 21/10 |
| EP | 0127263 | A2 | | 12/1984 |
| EP | 1128917 | A1 | | 9/2001 |
| GB | 886238 | A | | 1/1962 |
| GB | 1369882 | A | | 10/1974 |
| GB | 2066473 | A | | 7/1981 |
| GB | 2136128 | B | | 9/1984 |
| JP | S62220208 | A | | 9/1987 |
| JP | H04-307318 | A | | 10/1992 |
| JP | H05-177224 | A | | 7/1993 |
| JP | H07-198368 | A | | 8/1995 |
| JP | H09-21633 | A | | 1/1997 |
| JP | H10-089949 | A | | 4/1998 |
| JP | 2010-234408 | A | | 10/2010 |
| JP | 2010-279955 | A | | 12/2010 |
| JP | 2018-161666 | A | | 10/2018 |
| LU | 64961 | A | | 7/1972 |
| RU | 2077966 | C1 | | 4/1997 |
| SU | 1547900 | A1 | | 3/1990 |
| WO | WO 1992/013652 | A1 | | 8/1992 |

OTHER PUBLICATIONS

JP 60-161511A, Yamada et al. Aug. 1985.*
KR 2008-0037309A, Seo et al. Apr. 2008.*
JP 11-129003A, Aihara et al. May 1999.*
JP 7-311031A, Okuno et al. Nov. 1995.*
JP 6-88721A, Fukuda et al. Mar. 1994.*
Translation JP 60-161511A, Yamada et al. Aug. 1985.*
CN 106441201A, Huang et al. Feb. 2017.*
International Search Report dated Nov. 23, 2020 in corresponding PCT International Application No. PCT/EP2020/075190.
Written Opinion dated Nov. 23, 2020 in corresponding PCT International Application No. PCT/EP2020/075190.
Search Report from the related European Patent Application No. 19207929.1 dated Apr. 24, 2020.
Office Action dated May 29, 2023 issued in corresponding Japanese Patent Application No. 2022-525439 and English translation.
Chinese Office Action, dated Apr. 14, 2023, issued in corresponding Chinese Patent Application No. 202080077203.4 with English translation.
Japanese Notice of Allowance dated Sep. 25, 2023 in connection with corresponding Japanese Patent Application No. 2022-525439.
Notification to Grant a Patent Right for Invention dated Oct. 23, 2023 issued with in connection with corresponding Chinese Patent Application No. 202080077203.4. English translatlon attached.

* cited by examiner

METHOD OF CONTROLLING A ROLL GAP IN A ROLLING MILL

CROSS-REFERENCE TO RELATED APPLICATIONS

The present application is a 35 U.S.C. §§ 371 national phase conversion of PCT/EP2020/075190, filed Sep. 9, 2020, the contents of which are incorporated herein by reference, which claims priority of European Patent Application No. 19207929.1 filed Nov. 8, 2019, the contents of which are incorporated by reference herein. The PCT International Application was published in the English language.

FIELD OF THE INVENTION

The present invention relates to a method of controlling a roll gap between work rolls of a rolling mill.

BACKGROUND

In a rolling mill, two elongate work rolls are arranged one above the other in a horizontal orientation. The work surfaces of the work rolls are separated by a gap. In use, a metallic strip is formed by the work rolls as. The rolls pass through the gap in a generally horizontal orientation and in a direction of travel which is perpendicular to the longitudinal axes of the work rolls.

Correct setting of the gap between the work rolls is fundamental to efficient operation. The absolute gap must be the correct size in order to achieve the required thickness of the strip. Furthermore, it is important to maintain the gap at a uniform size along the length of the work rolls. If the gap size is not substantially uniform along the length, i.e. such that there is a difference in gap size between the left and right sides of the work rolls, the target strip thickness will not be achieved within the desired length at the start of a pass of the strip through the work rolls. Also, this difference in gap size between the left and right sides, or "differential gap", will cause the strip to deviate laterally from the axis of travel.

The reason for the presence of the differential gap is as follows. When new work rolls are inserted into a mill they will have been ground with a symmetric roll profile. The radius of each work roll is substantially constant along the length of the work roll. In use, the sources of heat generation and dissipation are not necessarily symmetric about the strip centerline and a temperature difference across the mill can therefore build up. Examples of the causes of this thermal asymmetry are the spindle arrangement (only on one side), the thrust bearing (again, only on one side), and differing rates of heat removal from the work roll bearings. This thermal profile results in asymmetrical roll thermal expansion, and thus the roll gap being larger on one side of the centerline than the other.

When a strip steers off-center from the axis of travel, a "cobble" or jam often occurs, resulting in an inevitable delay to production while the scrap is cleared. In extreme cases, the incoming slab might cool so much it cannot be rolled and has to be cut up and scrapped, with a consequent further delay. These delays feed back to the roughing mill, which might already be rolling the roughing passes for the next coil.

It is common to side trim after the last stand of a hot tandem mill. This is done with a pair of trimmer heads comprising rotary knives which trim a few tens of millimeters from each edge of the strip. The trimmer is typically three to four meters from the final stand. When the strip steers off-center the strip might well jam into one of the trimmer heads. The strip might also miss the trimmer head on the opposite side entirely.

Many producers are endeavoring to roll ever thinner and higher strength products on their mills. This increases the risk of a cobble as the differential gap becomes larger relative to the strip thickness in percentage terms. The larger the difference in percentage reduction on the two sides, the more severe the strip curvature will be.

From time to time, the operators will bring the rolls together without any strip to establish a datum for gap setting. This is commonly called the mill zero. But a full zero can be time consuming. Also frictional differences between the two work rolls lead to errors in the zero process itself and thus to errors in the gap setting.

In use, an operator watches the progress of the strip and intervenes if the strip begins to steer off-center. The intervention involves tilting one of the work rolls in order to reduce the differential gap while the strip continues to pass through the work rolls. In this way, the operator may bring the strip back toward the centerline. While this operation may prevent a cobble, it is manually intensive and does not allow for very accurate and rapid corrections of the average work roll gap size.

U.S. Pat. No. 4,397,097 relates to a gauge for measuring the size of a nip between a pair of rolls.

In view of the above there is a need for improved control of the gap between the work rolls of a rolling mill.

SUMMARY OF THE INVENTION

According to an aspect of the invention, there is provided a method of controlling a roll gap between first and second work rolls of a rolling mill, with work surfaces of the first and second work rolls are arranged in opposing relationship and respective longitudinal axes of the rolls lying in a common plane. In use, the work surfaces are spaced apart so as to form the gap for receiving a metallic product for rolling. The method comprises: defining a plurality of work surface locations spaced apart along the first work roll in the longitudinal direction; obtaining a radius of the work surface of the first work roll at each of the work surface locations; based on the radii of the work surface locations, obtaining a longitudinal profile of the work surface; based on the longitudinal profile, tilting the first work roll relative to the second work roll in the common plane in order to reduce a difference in the average size of the gap either side of a centerline which bisects the longitudinal axes of the first and second work rolls.

During rolling operations the work rolls will increase in temperature due to heat transfer from the metallic strip to the rolls. This increase in temperature causes the rolls to expand in diameter, thus causing the size of the gap between the rolls to be reduced. While conventional temperature and/or wear models may make compensations for the reduction in the size of the gap, the models cannot cater for the asymmetry in temperature and thus roll expansion. Accordingly the models do not address the problem of a differential gap between the rolls.

The inventive method solves this problem, by obtaining the radius of the roll at a plurality of locations along the length of the roll, using the radii to obtain a longitudinal profile of the roll, and using the longitudinal profile to tilt the roll in order to reduce (preferably minimize or eliminate) the difference in the average size of the gap at either side of the centerline, i.e. correct the differential gap.

While correction of the differential gap is the main advantage, an additional benefit is that any error in centerline (i.e. average) gap can also be identified and compensated for.

The method may comprise: based on the longitudinal profile, defining a linear component of the work surface of the first work roll; and based on said linear component, tilting the first work roll relative to the second work roll in the common plane in order to reduce the difference in the average size of the gap either side of the centerline which bisects the longitudinal axes of the first and second work rolls.

Obtaining the radius of the work surface of the first work roll at each of the work surface locations may comprise: defining a datum at a non-work surface of the first work roll; defining a plurality of datum reference points spaced apart in the longitudinal direction, each datum reference point being located in space radially of one of the work surface locations and being at a predetermined radial distance from the datum; measuring the radial distances between the datum reference points and the respective work surface locations; obtaining differences between the predetermined radial distances of the datum reference points from the datum, and the respective measured radial distances; and based on the differences, obtaining the radius of the work surface of the first work roll at each of the work surface locations.

Defining the plurality of datum reference points spaced apart in the longitudinal direction may comprise: providing a sensor at each of the datum reference points, each of the sensors being configured to measure the radial distance between the datum reference point and the respective work surface location.

The first work roll may comprise a metallic material and the sensors may comprise eddy current sensors for inducing eddy currents in the metallic material.

Obtaining the radius of the work surface of the first work roll at each of the work surface locations may comprise: with respect to each of the work surface locations, obtaining a radius of the work surface at a plurality of radial positions around the circumference of the work surface in order to obtain a plurality of radii; and averaging the plurality of radii to obtain the radius of the work surface at the respective work surface location.

The method may comprise: prior to obtaining the radius of the work surface of the first work roll at each of the work surface locations, bending the first and second work rolls along the longitudinal axes thereof to a predetermined amount.

The method may comprise: obtaining the radius of the work surface of the first work roll at each of the work surface locations when the work surface of the first work roll is in contact with the work surface of the second work roll.

The method may comprise: obtaining the radius of the work surface of the first work roll at each of the work surface locations when the work surface of the first work roll is spaced apart from the work surface of the second work roll.

The method may comprise: defining a plurality of work surface locations spaced apart along the second work roll in the longitudinal direction; obtaining a radius of the work surface of the second work roll at each of the work surface locations of the second work roll; based on the radii of the work surface locations of the second work roll, obtaining a longitudinal profile of the work surface of the second work roll; based on the longitudinal profiles of the work surfaces of the first and second work rolls, tilting the first work roll relative to the second work roll in the common plane in order to reduce the difference in the average size of the gap at either side of the centerline which bisects the longitudinal axes of the first and second work rolls.

Tilting the first work roll may comprise simultaneously applying first and second forces to respective first and second end portions of the first work roll, the first and second forces being equal in magnitude and opposite in direction, such that the first work roll is rotated about a central axis which extends through and normal to each of the longitudinal axis of the first work roll and the centerline which bisects the longitudinal axes of the first and second work rolls.

BRIEF DESCRIPTION OF THE DRAWINGS

Examples will now be described, by way of example, with reference to the accompanying figures in which:

FIG. 2 shows a schematic front view of the work rolls and a gap there between;

DETAILED DESCRIPTION OF EMBODIMENTS OF THE INVENTION

Figure 1:
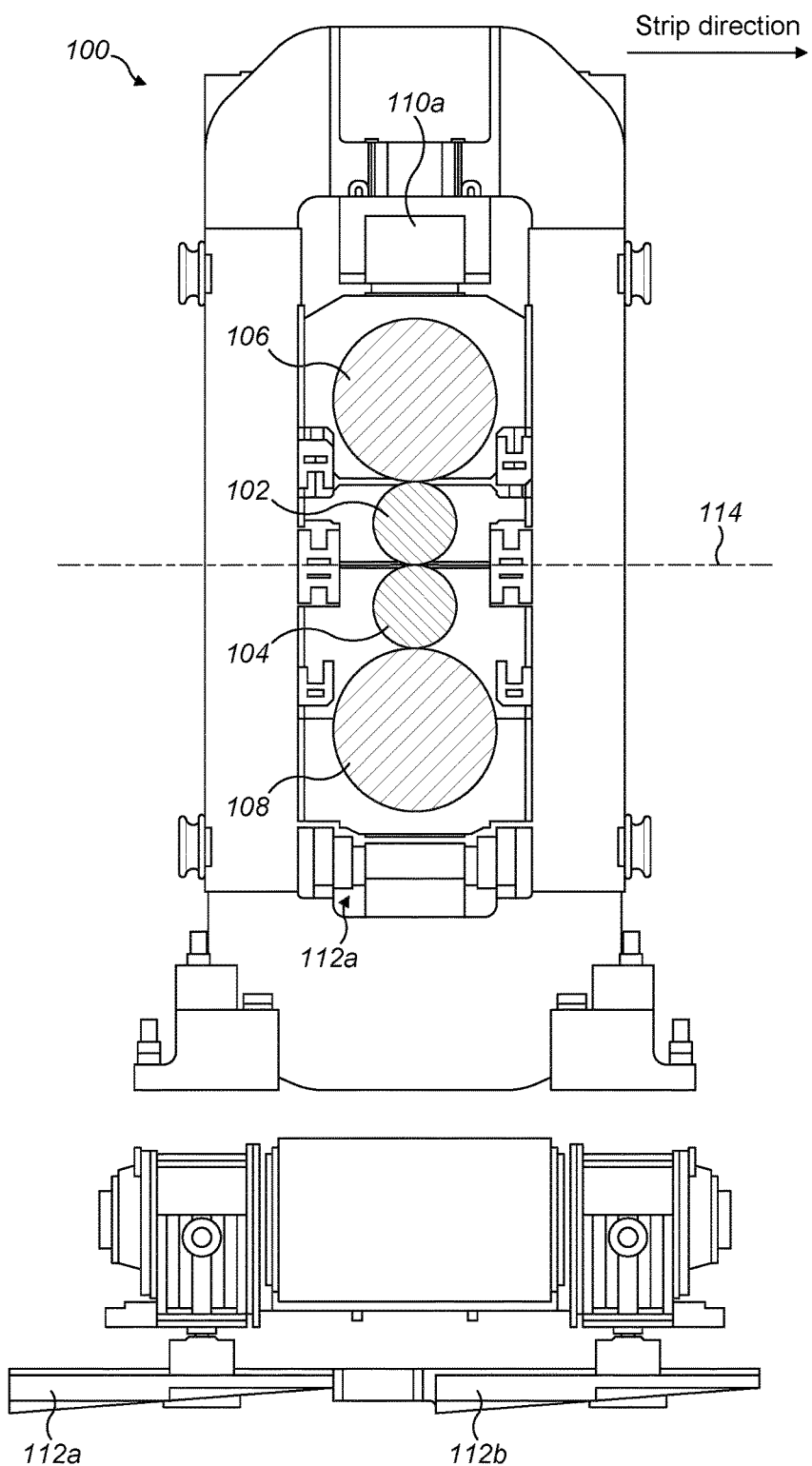
FIG. 1 shows a schematic side view of a rolling mill comprising a pair of work rolls.

Referring to FIG. 1, a rolling mill 100 comprises first and second work rolls 102, 104 each supported by a respective backup roll 106, 108. The longitudinal axes of the first and second work rolls 102, 104 and the backup rolls 106, 108 lie in a single, common plane (a vertical plane, in the sense of FIG. 1). A pair of hydraulic roll load cylinders 110a, 110b (only one of which is visible in FIG. 1) are arranged to apply a rolling force to the first work roll 102 via its respective backup roll 106. The position of the second work roll 104 and its respective backup roll 108 is set by a pair of wedges 112a, 112b located at the base of the rolling mill 100. In this example, the first and second work rolls 102, 104 are constructed from steel. (The rolling mill 100 of FIG. 1 is a typical hot mill arrangement. In cold mills the hydraulic roll load cylinders are often at the bottom and the wedges are at the top. The present invention is applicable to both hot and cold rolling and it will therefore be understood that the positions of the wedges and hydraulic roll load cylinders may be reversed).

The first and second work rolls 102, 104 will tend to become worn during rolling operations and they are therefore periodically reground to ensure that their roll surfaces are suitable for rolling. The regrinding causes the diameters of the work rolls 102, 104 to decrease from their new (maximum) size to a reject (minimum) size. A mixture of new, partially worn, and reject diameter work rolls can be present in the mill 100 at any one time. It is impractical for the hydraulic roll load cylinders 110a, 110b to cater for the range of positions these diameter changes result in, hence the inclusion of the wedges 112a, 112b whose adjustment ensures that the top part of the second work roll 104 is in the desired position. This position is generally at or near to the strip pass line 114, which is determined from operator-entered values of work roll diameter.

Figure 2:
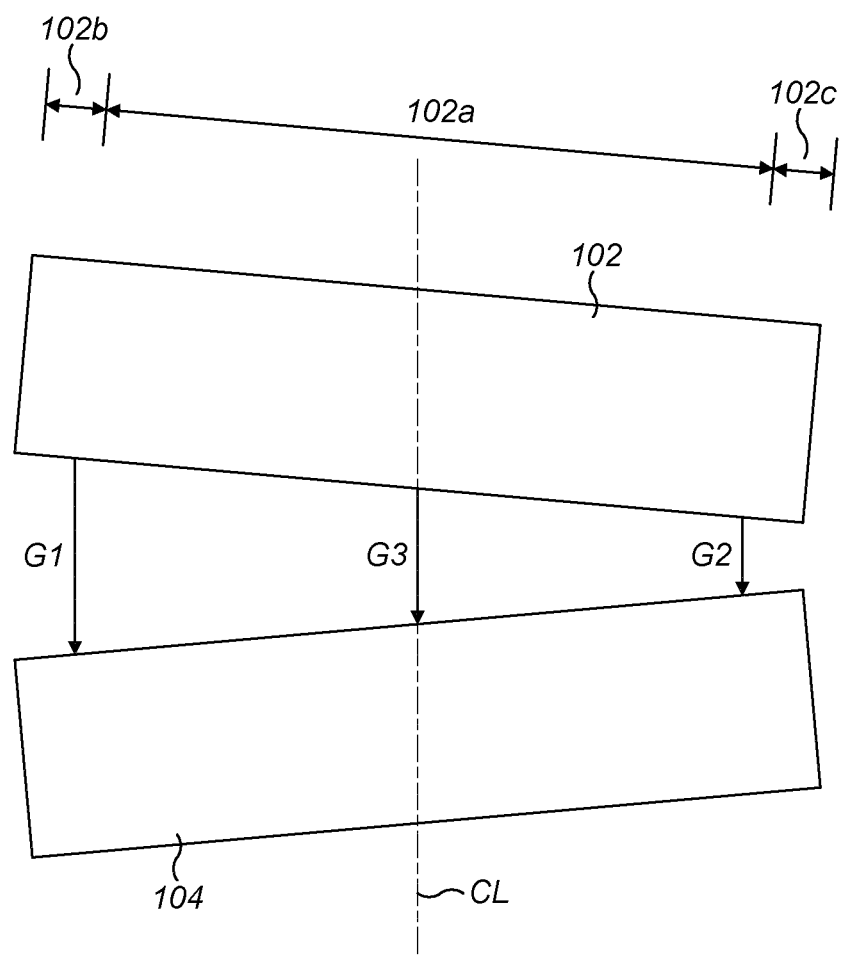

Referring to FIG. 2, during mill operations there may exist a differential gap between the opposing first and second work rolls 102, 104, for example due to the reasons discussed herein above. As shown in the drawing, a centerline CL bisects the longitudinal axes of the first and second work rolls 102, 104. On the left side of the centerline CL the gap has a larger size component G1 while on the right side of the centerline CL, the gap G has a smaller size component G2, while at the centerline CL the gap has an averaged size component G3, i.e. (G1+G2)/2. It will be understood that in the drawing, the difference in gap size between the two sides has been exaggerated for the purpose of illustration. It will be further understood that the gap could instead have a smaller component on the left side and a larger component on the right side.

Still referring to FIG. 2, a middle portion of the first work roll 102 comprises a working surface 102a which extends between a pair of non-working surfaces 102b, 102c located at the end portions of the first work roll 102. Although not shown in the drawing, the second work roll 104 similarly comprises a working surface 104a extending between a pair of non-working surfaces 104b, 104c. As used herein with regard to the work rolls 102, 104, "working surface" means the surface of the work roll which is in contact with the metallic strip during rolling operations, while "non-working surface" means a surface of the work roll which is generally not in contact with the metallic strip. During rolling operations the non-working surfaces 102b, 102c; 104b, 104c are expected to be significantly cooler than the working surface 102a, 104a and should therefore be less prone to wear and deformation. Outside the metallic strip width there will be no wear (any wear from roll-to-roll contact during a mill zero being negligible). Because the work rolls 102, 104 are cooler at these points they also have smaller thermal expansion. It will be understood that the ratio, of longitudinal length of the working surface 102a to the longitudinal length of the non-working surfaces 102b, 102c, could differ from that shown in FIG. 2.

Figure 3A:
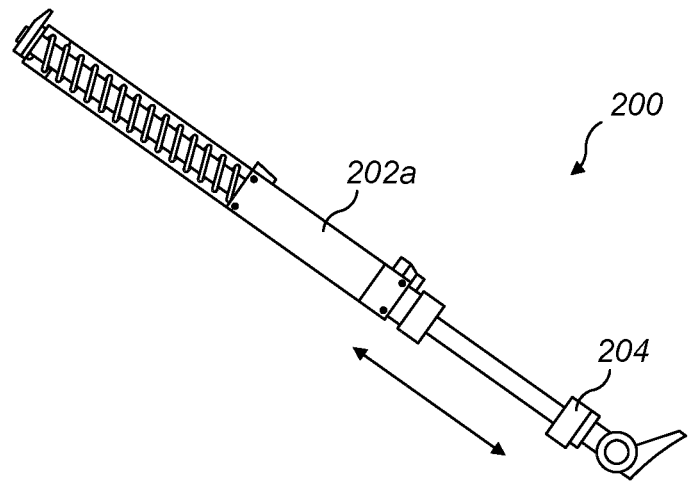
FIGS. 3a and 3b show respective side and front views of a work roll measurement device.
Figure 3B:
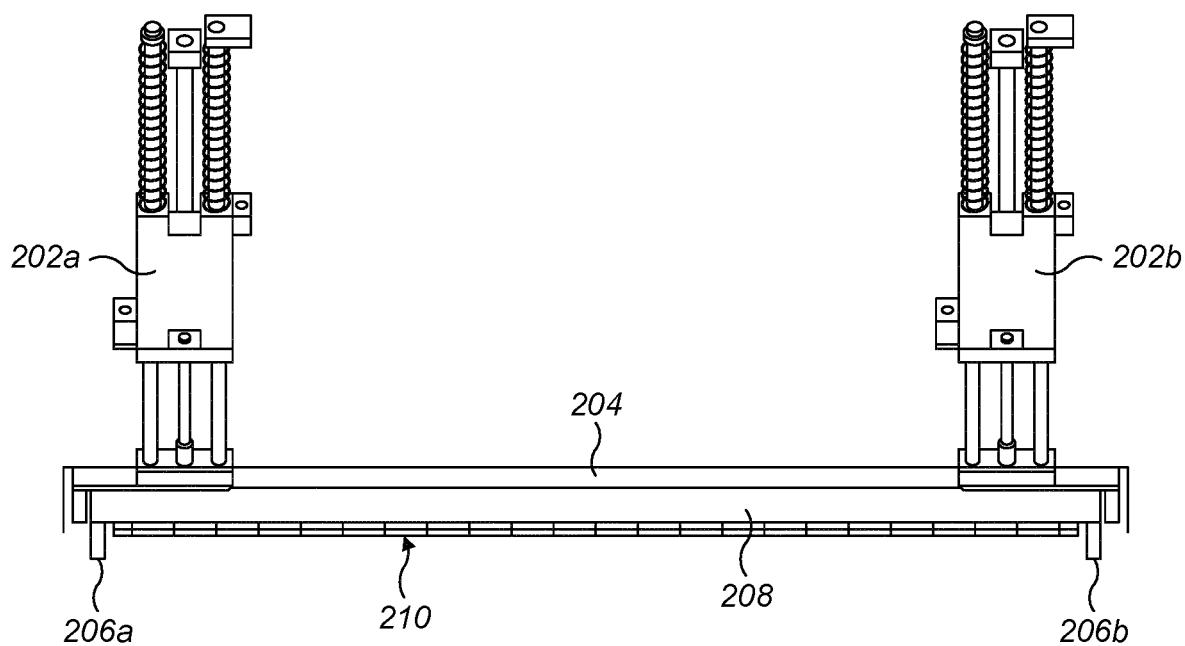

Turning to FIGS. 3a and 3b, in this example a work roll measuring device 200 comprises a pair of telescopic support arms 202a, 202b which are spaced apart and connected together by an elongate cross-member 204. At each end of the cross-member 204 there is provided a support foot 206a, 206b which is arranged to pivot about the longitudinal axis of the cross-member 204. The two ends of an elongate sensor beam 208 are attached to the respective support feet 206a, 206b (e.g. by bolts) such that the sensor beam 208 extends between the support feet 206a, 206b below the cross-member 204 and in parallel relationship therewith. A plurality of sensors 210 are mounted on the sensor beam 208. In this example, the sensors 210 are arranged in a single row (or line) along the sensor beam 208 in the longitudinal direction and are spaced apart from one another by gaps. In this example there are 25 sensors 210. In this example, the sensors 210 comprise eddy current sensors.

The work roll measuring device 200 is adapted to be attached to the rolling mill 100 (or may alternatively form an integral part of the rolling mill 100) such that the sensor beam 208 is selectively moveable toward and away from the first and second work rolls 102, 104 by means of the telescopic support arms 202a, 202b.

An operational sequence of the rolling mill 100 will now be described.

(1) When new work rolls are introduced to the mill, they will have no thermal camber, just a ground camber (if any). A mill zero sequence is always required at this point. This will be followed by the profile measurement sequence as described below to establish a datum for the profile measurement. The rolling mill 100 is therefore zeroed. Mill zeroing is a sequence of operations to establish the extension of the hydraulic roll load cylinders 110a, 110b when the working rolls 102, 104 touch. This information is useful for gap setting. To zero the rolling mill 100, the hydraulic roll load cylinders 110a, 110b are stroked out in position until the working rolls 102, 104 touch, at which point the control is switched to force control and the force is increased to the zeroing load. The working rolls 102, 104 are rotated while still in contact. Once the forces are stabilized and are equal on the two sides, the cylinder extensions are recorded and averaged over a defined number of revolutions (e.g. two) of the backup rolls 106, 108. The average cylinder extension obtained becomes the zero or datum extension.

(2) The first and second work rolls 102, 104 are rotated at a steady speed and a metallic strip is passed between the work rolls 102, 104. The differential gap and the positions of the hydraulic roll load cylinders 110a, 110b are sampled while rolling and running average values are stored. Preferably the strip steer trim is also averaged and stored.

(3) Toward the end of the pass of the strip, the first and second work rolls 102, 104 are slowed down. At this time the averaged values of the differential gap and the positions of the hydraulic roll load cylinders 110a, 110b (and preferably the averaged value of strip steer trim) are frozen and stored in readiness for the start of the next coil.

(4) Once the strip has left the roll bite, the hydraulic roll load cylinders 110a, 110b are controlled to apply forces in order to bend the first and second work rolls 102, 104 along their longitudinal axes to a predetermined degree of bending.

(5a) Referring now to FIGS. 4a-5b, the telescopic support arms 202a, 202b of the work roll measuring device 200 are extended in order to move the sensor beam 208 to the first work roll 102. Each support foot 206a, 206b of the work roll measuring device 200 comprises a bearing 206a1, 206b1 which allows the support foot 206a, 206b to pivot on the cross-member 204, and a pair of spaced guide wheels (or rollers) 206a2 which are brought into contact with the first work roll 102, the pivoting action of the support feet 206a, 206b providing self-alignment of the guide wheels 206a2 on the first work roll 102. Preferably the guide wheels 206a2 are constructed from a material which will not damage or mark the surface of the first work roll 102, for example polyurethane.

Figure 4A:
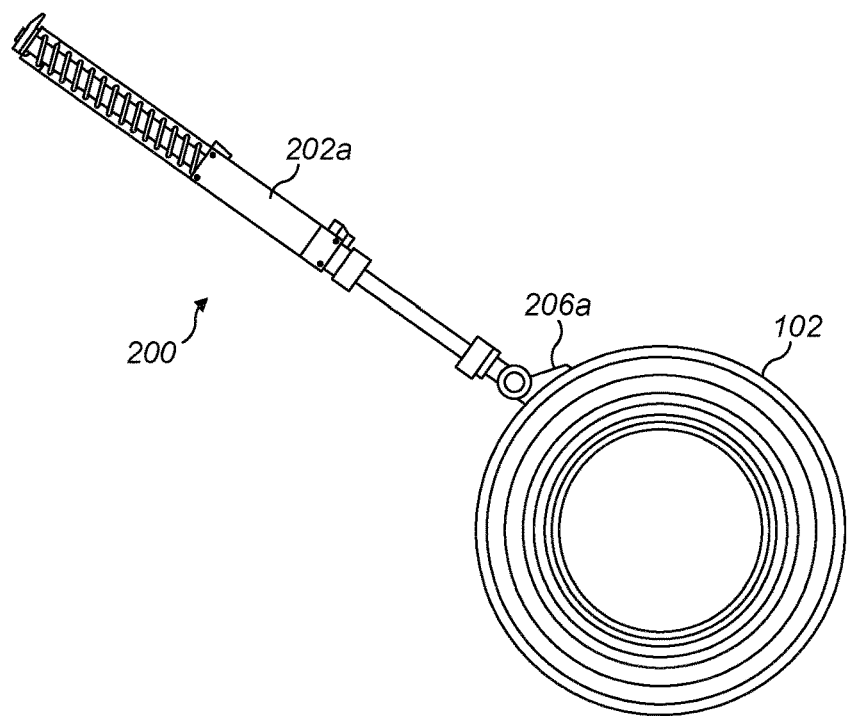
FIGS. 4a-5b show the measurement device in use with one of the work rolls.
Figure 4B:
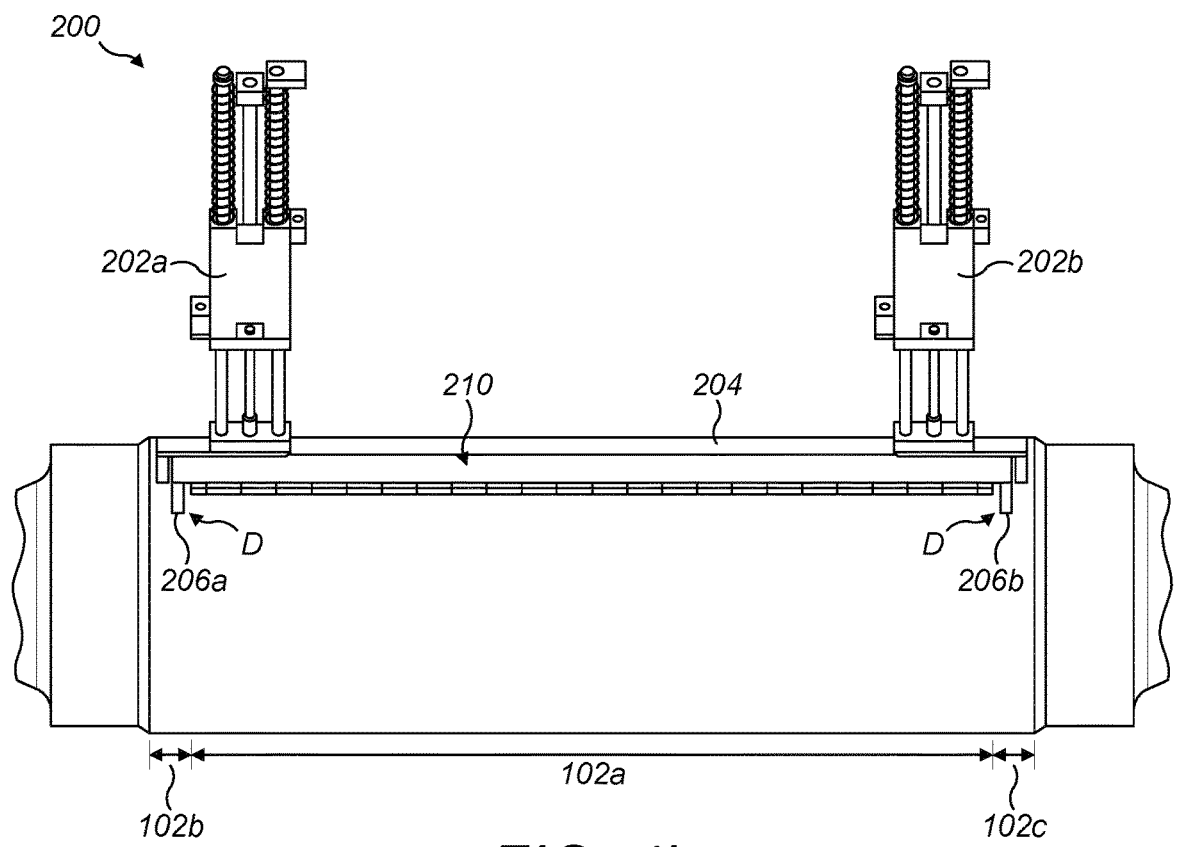
Figure 5A:
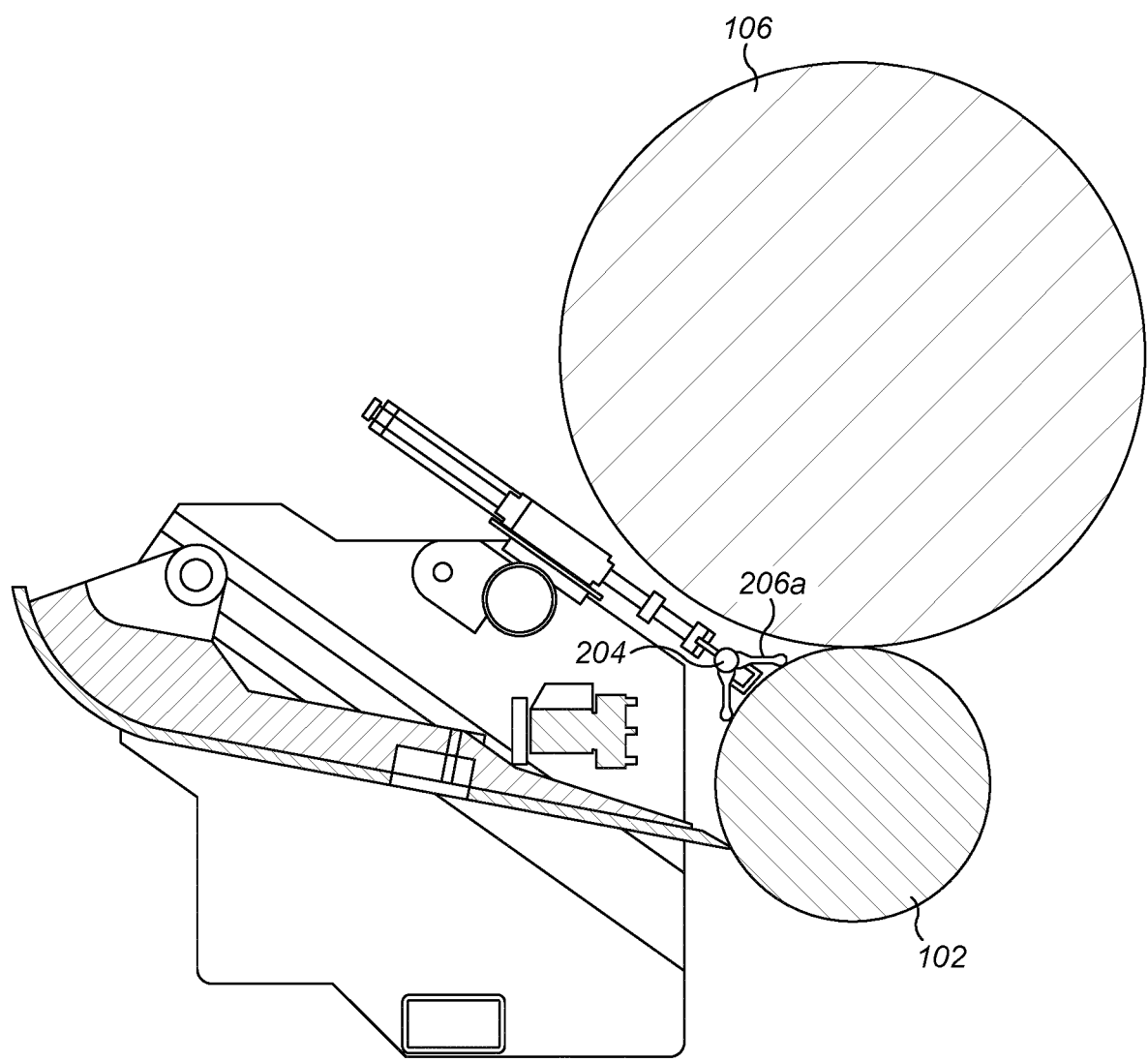
Figure 5B:
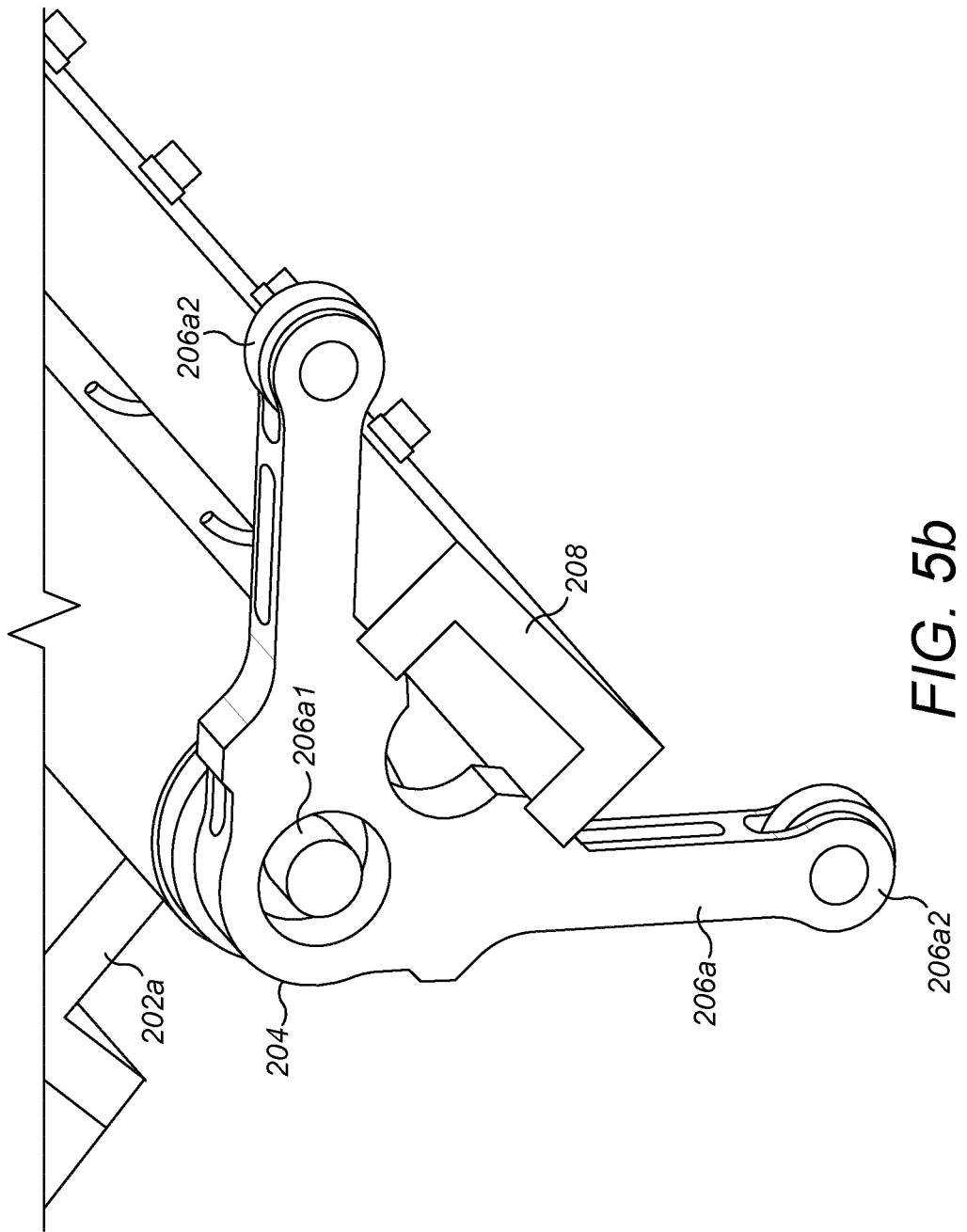

Referring in particular to FIGS. 4b and 5b, with the work roll measuring device 200 so positioned, the sensor beam 208 lies over and along the work surface 102a of the first work roll 102 in the longitudinal direction, the sensor beam 208 being separated from the work surface 102a by a small radial gap. Thus each one of the sensors 210 which are mounted on the sensor beam 208 projects downwardly onto a respective location on the work surface 102a below the sensor 210, said respective locations extending along the length of the work surface 102a. Furthermore, each of the support feet 206a, 206b of the work roll measuring device 200 is located on one of the two non-work surfaces 102b, 102c of the first work roll 102.

With regard to the work roll measuring device 200, the distance of each of the sensors 210 from the guide wheels 206a2 is predetermined. Thus, the positions of the guide wheels 206a2, on the non-work surfaces 102b, 102c of the first work roll 102, provide a datum for the measurements. That is, the points of contact of the guide wheels 206a2 on the non-work surfaces 102b, 102c provide a datum.

In other words, the non-work surfaces 102b, 102c effectively provide a measurement datum. Furthermore the positions of the sensors 210 provide a plurality of datum reference points. Temperature sensors may be provided adjacent to the guide wheels 206a2, for measuring the temperature of the non-work surfaces 102b, 102c to assist in the establishment of the datum.

The first work roll 102 is rotated at a steady speed and the sensors 210 are activated. As the first work roll 102 turns, each of the sensors 210 repeatedly measures the radial distance between the sensor and the respective (projected) location on the work surface 102a below the sensor 210. The measurements are stored in a database. Any variation in the rolling radius of the non-work surfaces 102b, 102c is accommodated by the bearings 206a1, 206b1 which allow the support feet 206a, 206b to pivot.

Once the measurements have been taken and stored, the telescopic support arms 202a, 202b of the work roll measuring device 200 are retracted in order to move the sensor beam 208 away from the first work roll 102.

(5b) Using the above-mentioned knowledge, of the predetermined radial distance from each sensor to the datum on the non-work surfaces 102b, 102c, and the radial distance from the datum of each of said locations on the work surface 102a is obtained. With regard to each of the locations, an average of the radius around the circumference of the work surface 102a is calculated. Thus a rolling radius of the work surface 102a is obtained at each of said locations along the length of the work surface 102a.

Figure 6:
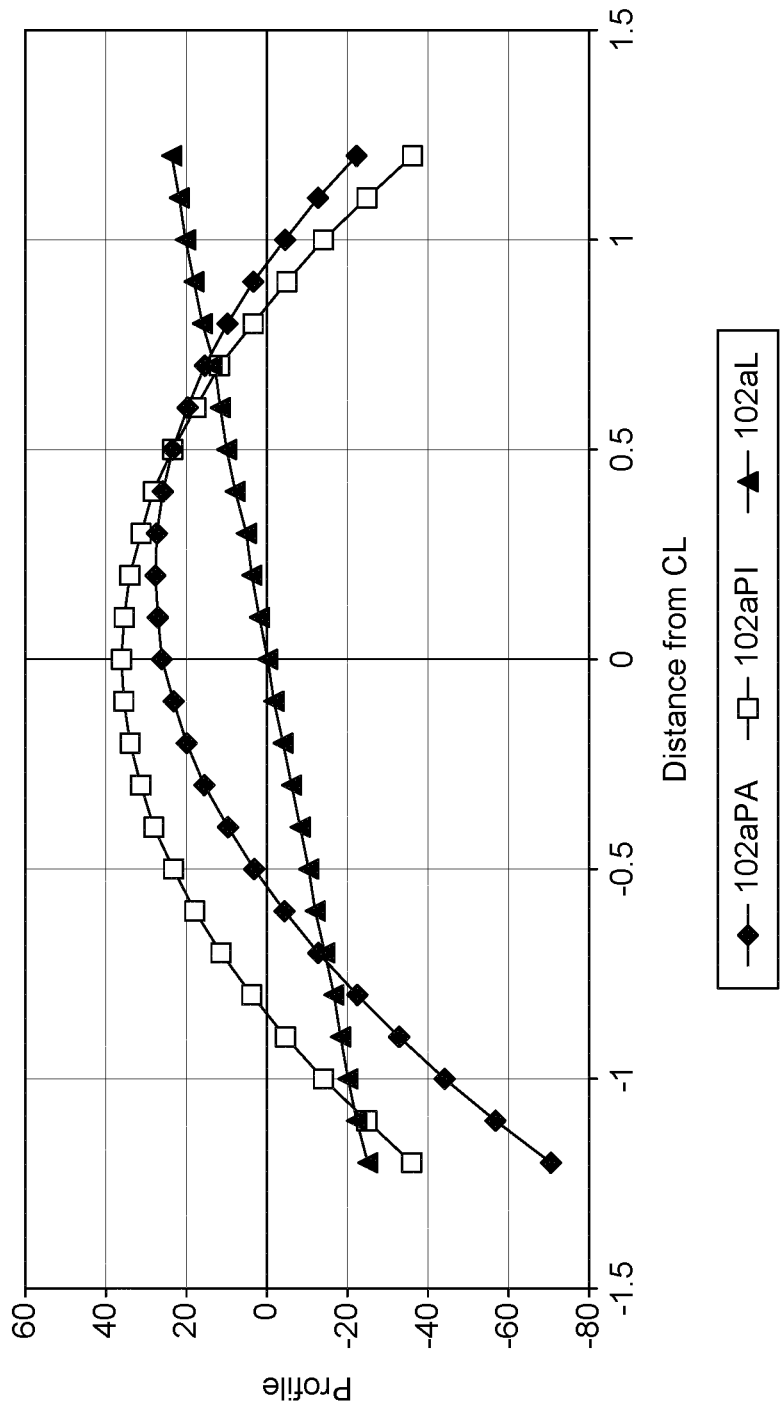
FIG. 6 shows data relating to measurements of the work roll.

FIG. 6 shows an exemplary plot of the rolling radius along the length of the work surface 102a, i.e. a longitudinal profile 102aPA of the actual work surface 102a. Also included in the figure is a parabola which represents an ideal profile 102aPI wherein the rolling radius is symmetrical about the centerline CL. Thus it will be seen that the actual longitudinal profile 102aPA of the work surface 102a is not ideal and therefore a correction is required in order to reduce a difference in the average size of the gap on either side of the centerline CL.

(5c) For this purpose a linear component 102aL of the longitudinal profile 102aPA is obtained, using a suitable conventional mathematical method. A peak-to-peak amplitude of the linear component 102aL is used as an input for the hydraulic roll load cylinders 110a, 110b to tilt the first work roll 102 relative to the second work roll 104 in the plane of the first and second work rolls 102, 104.

In this way the difference in the average size of the roll gap at either side of the centerline is reduced and preferably minimized. A visual display of the tilt is preferably provided to the operator.

During the tilting of the first work roll 102, one of the hydraulic roll load cylinders 110a, 110b is retracted while the other is extended, the adjustments being equal and opposite such that the total rolling force will be kept constant and thus the thickness of the strip will be unchanged during a rolling operation.

Preferably, the previously-obtained and stored averaged values of the differential gap and the positions of the hydraulic roll load cylinders 110a, 110b (and preferably the averaged value of strip steer trim) are combined with the tilt and average gap data for fine tuning during rolling operations.

The steer and differential positions of the hydraulic roll load cylinders 110a, 110b from a previous pass of the strip, along with the longitudinal profile 102aPA of the work surface 102a of the first work roll 102, may be provided to thermal and/or wear models of the rolling mill 100. The stored measurements of the radii of the work surface 102a may be used to obtain knowledge of how the roll profile changes over time during the life of the first work roll 102.

In the described example, the sensor measurements of the work surface 102a of the first work roll 102 are taken while the first work roll 102 is rotating, and, with regard to each of the locations along the length of the work surface 102a, an average of the radii around the circumference of the work surface 102a is calculated. Less preferably, the sensor measurements of the work surface 102a may be taken while the first work roll 102 is stationary, and, with regard to each of the locations along the length of the work surface 102a, a single measurement of radial distance may be taken and these single measurements used to obtain the longitudinal profile of the work surface 102a.

It will be understood that the longitudinal profile 102aPA of the work surface 102a of the first work roll 102 could be obtained using a variety of functions, the linear component 102aL being just one of these. For example, the longitudinal profile 102aPA could be obtained in terms of the area under the curve per unit length of the work roll.

It will be understood that the sensors could take any form suitable for measuring the distance to the work surface 102a of the first work roll 102, with eddy current sensors being just one example. Also the sensors 210 may be omitted and some other means used for obtaining the radii of the work surface 102a at each of the work surface locations along the length of the first work roll 102. For example, photographic images of the work surface 102a may be taken and the radii obtained from these.

In the described example, only the work surface 102a of the first work roll 102 is measured and the longitudinal profile obtained. In this example it is assumed that the longitudinal profile 104aPA of the work surface 104a of the second work roll 104 will be generally similar to that of the first. In another example, the work surface 104a of the second work roll 104 is also measured and the longitudinal profile 104aPA of said work surface 104a is also obtained, in the manner described above. This knowledge of the second work roll 104 may allow for more accurate control of the roll gap.

Whether the work surface of one or both of the first and second work rolls 102, 104 is measured, during measurement the rolls may be in contact with each other or they may be spaced apart by a gap.

It may be desirable to measure the temperature of the non-working surfaces 102b, 102c; 104b, 104c of the first and second work rolls 102, 104. This can be done by a contact or a non-contact temperature sensor. With these temperatures, it will be possible to extrapolate roll temperature across the width using the measured work roll growth.

The device and control scheme could be extended in the measurements taken. It could also be used on some or all of the other stands in the rolling mill. Additional distance sensors could be fitted between the reference points in order to measure the overall work roll camber. This feedback of true camber could then be used as an input to mathematical models to set the roll bending setting for the next workpiece. Temperature sensors could be fitted to measure the thermal profile.

It should be understood that the invention has been described in relation to its preferred embodiments and may be modified in many different ways without departing from the scope of the invention as defined by the accompanying claims.

The invention claimed is:

1. A method of controlling a roll gap between first and second work rolls of a rolling mill, wherein work surfaces of the first and second work rolls are arranged in opposing relationship and respective longitudinal axes of the rolls are lying in a common plane;
in use the work surfaces are spaced apart so as to form a gap for receiving a metallic product for rolling, the method comprising:
defining a plurality of work surface locations spaced apart along the first work roll in the longitudinal direction;
obtaining, with a plurality of sensors arranged along a row, a radius of the work surface of the first work roll at each of the work surface locations by activating the sensors repeatedly while rotating the first work roll;
based on the radii of the work surface locations, obtaining a longitudinal profile of the work surface;
based on the longitudinal profile, tilting the first work roll relative to the second work roll in the common plane in order to reduce a difference in the average size of the gap at either side of a centerline which bisects the longitudinal axes of the first and second work rolls.

2. A method according to claim 1, comprising:
based on the longitudinal profile, defining a linear component of the work surface of the first work roll; and
based on the linear component, tilting the first work roll relative to the second work roll in the common plane in order to reduce the difference in the average size of the gap at either side of the centerline which bisects the longitudinal axes of the first and second work rolls.

3. A method according to claim 1, wherein obtaining the radius of the work surface of the first work roll at each of the work surface locations comprises:
defining a datum at a non-work surface of the first work roll;
defining a plurality of datum reference points spaced apart in the longitudinal direction, each datum reference point being located in space radially of one of the work surface locations and being at a predetermined radial distance from the datum;
measuring the radial distances between the datum reference points and the respective work surface locations;
obtaining differences between the predetermined radial distances of the datum reference points from the datum, and the respective measured radial distances; and
based on the differences, obtaining the radius of the work surface of the first work roll at each of the work surface locations.

4. A method according to claim 3, wherein defining the plurality of datum reference points spaced apart in the longitudinal direction comprises:
providing a sensor at each of the datum reference points, each of the sensors being configured to measure the radial distance between the datum reference point and the respective work surface location.

5. A method according to claim 4, wherein:
the first work roll comprises a metallic material; and
the sensors comprise eddy current sensors for inducing eddy currents in the metallic material.

6. A method according to claim 1, wherein obtaining the radius of the work surface of the first work roll at each of the work surface locations comprises:
with respect to each of the work surface locations, obtaining a radius of the work surface at a plurality of radial positions around the circumference of the work surface in order to obtain a plurality of radii; and
averaging the plurality of radii to obtain the radius of the work surface at the respective work surface location.

7. A method according claim 1, comprising:
prior to obtaining the radius of the work surface of the first work roll at each of the work surface locations, bending the first and second work rolls along the longitudinal axes thereof to a predetermined amount.

8. A method according to claim 1, comprising obtaining the radius of the work surface of the first work roll at each of the work surface locations when the work surface of the first work roll is in contact with the work surface.

9. A method according to claim 1, obtaining the radius of the work surface of the first work roll at each of the work surface locations when the work surface of the first work roll is spaced apart from the work surface of the second work roll.

10. A method according to claim 1, comprising:
defining a plurality of work surface locations spaced apart along the second work roll in the longitudinal direction;
obtaining a radius of the work surface of the second work roll at each of the work surface locations of the second work roll;
based on the radii of the work surface locations of the second work roll, obtaining a longitudinal profile of the work surface of the second work roll;
based on the longitudinal profiles of the work surfaces of the first and second work rolls, tilting the first work roll relative to the second work roll in the common plane in order to reduce the difference in the average size of the gap at either side of the centerline which bisects the longitudinal axes of the first and second work rolls.

11. A method according to claim 1, wherein tilting the first work roll comprises simultaneously applying first and second forces to respective first and second end portions of the first work roll, the first and second forces being equal in magnitude and opposite in direction, such that the first work roll is rotated about a central axis which extends through and normal to each of the longitudinal axis of the first work roll and the centerline which bisects the longitudinal axes of the first and second work rolls.

* * * * *